(12) United States Patent
Tai et al.

(10) Patent No.: US 9,171,227 B2
(45) Date of Patent: Oct. 27, 2015

(54) APPARATUS AND METHOD EXTRACTING FEATURE INFORMATION OF A SOURCE IMAGE

(71) Applicant: SAMSUNG ELECTRONICS CO., LTD., Suwon-si, Gyeonggi-do (KR)

(72) Inventors: Yong Min Tai, Gunpo-si (KR); Young Su Moon, Seoul (KR); Jung Uk Cho, Hwaseong-si (KR); Joon Hyuk Cha, Incheon (KR); Hyun Sang Park, Cheonan-si (KR); Shi Hwa Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 85 days.

(21) Appl. No.: 13/922,449

(22) Filed: Jun. 20, 2013

(65) Prior Publication Data

US 2013/0343655 A1   Dec. 26, 2013

(30) Foreign Application Priority Data

Jun. 20, 2012 (KR) .................. 10-2012-0066061

(51) Int. Cl.
*G06K 9/46* (2006.01)
*G06K 9/00* (2006.01)

(52) U.S. Cl.
CPC .......... *G06K 9/4671* (2013.01); *G06K 9/00973* (2013.01); *G06K 9/4642* (2013.01)

(58) Field of Classification Search
CPC .. G06K 9/4614; G06K 9/4671; G06K 9/6201
USPC .......... 382/195, 294, 284, 128, 131, 132, 274
See application file for complete search history.

(56) References Cited

U.S. PATENT DOCUMENTS

| | | | |
|---|---|---|---|
| 7,006,111 B1 * | 2/2006 | Rothrock | 345/629 |
| 2006/0171594 A1 | 8/2006 | Avidan et al. | |
| 2010/0169576 A1 * | 7/2010 | Chen | 711/122 |
| 2010/0209009 A1 * | 8/2010 | Matsunaga | 382/224 |
| 2010/0246976 A1 * | 9/2010 | Tolstaya | 382/218 |
| 2012/0201466 A1 * | 8/2012 | Funayama et al. | 382/195 |
| 2012/0263388 A1 * | 10/2012 | Vaddadi et al. | 382/225 |
| 2014/0212048 A1 * | 7/2014 | Akagunduz | 382/195 |

FOREIGN PATENT DOCUMENTS

| | | |
|---|---|---|
| JP | 10-93819 | 4/1998 |
| JP | 2007-323192 | 12/2007 |
| JP | 2008-165780 | 7/2008 |
| JP | 2009-70066 | 4/2009 |

(Continued)

*Primary Examiner* — Mike Rahmjoo
(74) *Attorney, Agent, or Firm* — Staas & Halsey LLP

(57) ABSTRACT

Provided is an apparatus and method for extracting feature information of an image using a scale-invariant feature transform (SIFT) algorithm. The apparatus may include a first interface configured to generate one or more tile images from a first source image stored in a particular memory, such as a high-capacity short-term memory, and a feature information extractor configured to receive the generated one or more tile images and to respectively extract feature information from each of the one or more input tile images, where the first interface may be configured to generate the one or more tile images by selectively dividing the first source image into the one or more tile images based on a horizontal resolution of the first source image.

22 Claims, 10 Drawing Sheets

(56) References Cited

FOREIGN PATENT DOCUMENTS

| | | |
|---|---|---|
| JP | 2010-9599 | 1/2010 |
| KR | 10-2009-0020452 | 2/2009 |
| KR | 10-2010-0073749 | 7/2010 |
| KR | 10-0986809 | 10/2010 |
| KR | 10-2011-0034991 | 4/2011 |
| KR | 10-2011-0037183 | 4/2011 |
| KR | 10-2011-0060454 | 6/2011 |
| KR | 10-2011-0116609 | 10/2011 |

* cited by examiner

700

900

APPARATUS AND METHOD EXTRACTING FEATURE INFORMATION OF A SOURCE IMAGE

CROSS-REFERENCE TO RELATED APPLICATIONS

This application claims the priority benefit of Korean Patent Application No. 10-2012-0066061, filed on Jun. 20, 2012, in the Korean Intellectual Property Office, the disclosure of which is incorporated herein by reference.

BACKGROUND

1. Field

One or more embodiments relate to an apparatus and method for extracting feature information using a scale-invariant feature transform (SIFT) algorithm applied to a high-capacity source image, irrespective of a processing capacity of an SIFT core, by dividing the high-capacity source image into one or more tile images and respectively reading and processing the one or more tile images to extract respective feature information.

2. Description of the Related Art

A scale-invariant feature transform (SIFT) algorithm used to extract a location of a feature in an image and to store a descriptor for the feature is widely used in image processing applications.

Feature information generated using the SIFT algorithm, including the feature location and the descriptor, for example, has robust properties against changes in illumination, rotation, scaling, and viewpoint.

Accordingly, the SIFT algorithm may be used for matching at least two images in image processing applications based upon respectively known feature information.

That is, since the SIFT algorithm extracts a robust feature against changes in image size, rotation, and illumination, for example, the SIFT algorithm may be used for correct or enhance a matching in an image.

However, to extract feature information using the SIFT algorithm, a relatively large amount of calculation is required to perform the necessary SIFT algorithm processing of the entire source image.

The SIFT algorithm may be implemented in hardware and/or software for distributed image processing. However, in spite of a hardware cost associated with fast processing of a high-definition high-capacity image, processing of all functions as hardware may be preferable.

SUMMARY

One or more embodiments include an apparatus configured to extract feature information, the apparatus including a first interface configured to generate plural tile images from a first source image by reading respective portions of the first source image stored in a high-capacity short-term memory, and a feature information extractor configured to extract feature information from at least one of the plural tile images by applying a feature transform to the at least one tile image, wherein the first interface is configured to generate the at least one tile image by dividing the first source image, into at least one of the respective portions of the first source image, based on a horizontal resolution of the first source image.

The respective portions may overlap.

The first interface may complete a writing of the generated at least one tile image to a buffer memory, having less capacity than the high-capacity short-term memory, even when a horizontal resolution of the first source image is greater than a horizontal capacity of the buffer memory.

The buffer memory may be a SRAM memory and the high-capacity short-term memory may be a DRAM memory.

A configuration of the first interface and the feature information extractor may conform with an ARM architecture.

The feature transform may be a scale-invariant feature transform (SIFT) algorithm.

The first interface may be configured to generate a first tile image and a second tile image by dividing the first source image, corresponding to the respective portions of the first source image, based on a horizontal resolution of the first source image, such that an overlapping region of each of the first tile image and the second tile image has a predetermined size.

The first interface may be configured to perform a reading of one of the respective portions of the source image from the high-capacity short-term memory, wherein the reading of the one portion of the source image is performed by writing the one portion of the source image into a buffer memory, as the first tile image, distinct from the high-capacity short-term memory, and wherein the buffer memory has a horizontal capacity that is less than a horizontal capacity of the high-capacity short-term memory.

The feature information extractor may be configured to extract, as the feature information, a feature location of the first tile image and a descriptor corresponding to the feature location of the first tile image.

The feature information extractor may be configured to extract, as the feature information, at least one of a feature location of the at least one tile image and a descriptor corresponding to the feature location.

The feature information extractor may be configured to determine the at least one tile image to respectively be at least one first octave, to generate at least one Gaussian image by convolving the at least one first octave with a Gaussian filter, to generate at least one difference of Gaussians (DoG) image from the at least one Gaussian image generated, to generate a candidate feature from the at least one DoG image generated, and to extract the feature information from the candidate feature.

The feature information extractor may further be configured to determine the at least one first octave, generate the at least one Gaussian image, generate the at least one DoG image, generate the candidate feature from the at least one generated DoG image, and extract the feature information, according to a scale-invariant feature transform (SIFT) algorithm.

The feature information extractor may be configured to determine the at least one tile image to be at least one first octave and to determine a first candidate feature from the determined at least one first octave, the feature information extractor may be configured to generate at least one second octave by downsizing the at least one first octave and to determine a second candidate feature based on the generated at least one second octave, and the feature information extractor may be configured to extract the feature information by comparing the determined first candidate feature to the determined second candidate feature.

The apparatus may further include a second interface configured to generate at least one reduced image by the downsizing of the at least one first octave, to generate a second source image by removing an overlapped region of the generated at least one reduced image, and to execute write processing of the generated second source image to store the generated second source image in the high-capacity short-term memory.

The first interface may be configured to generate at least one tile image of the second source image by reading a respective portion of the second source image, of plural portions of the second source image, from the high-capacity short-term memory, and the feature information extractor may be configured to determine the at least one tile image of the second source image as a second octave and to determine a second candidate feature of the second octave.

One or more embodiment may include an apparatus configured to extract feature information, the apparatus including a reading unit configured to read at least one first tile image from a respective portion of a first source image, of plural portions of the first source image, stored in a high-capacity short-term memory, a scale-invariant feature transform (SIFT) algorithm operating unit configured to generate a first candidate feature by applying an SIFT algorithm to the at least one first tile image of the first source image, and a writing unit configured to generate a second source image by synthesizing a down-sized image of the at least one first tile of the first source image and to execute write processing of the generated second source image to the high-capacity short-term memory, wherein the reading unit is configured to read at least one tile image from a respective portion of the second source image, of plural portions of the second source image, and the SIFT algorithm operating unit is configured to generate a second candidate feature from the read at least one tile image of the second source image and to generate feature information based on the generated first candidate feature and the generated second candidate feature.

The reading unit may be configured to read the at least one first tile image of the first source image, from the high-capacity short-term memory, based on a horizontal resolution of the first source image and to read the at least one tile image of the second source image, from the high-capacity short-term memory, based on a horizontal resolution of the second source image.

The reading unit may be configured to read each of the at least one first tile image of the first source image such that respective overlapped regions exist in first tile images that correspond to adjoining portions of the first source image and/or to read each of the at least one tile image of the second source image such that respective overlapped regions exist in first tile images that correspond to adjoining portions of the second source image.

The writing unit may be configured to generate the second source image by synthesizing the down-sized image based on an overlapped region.

One or more embodiments may include a method of extracting feature information of a source image, the method including generating plural tile images from a first source image by reading respective portions of the first source image stored in a high-capacity short-term memory, and extracting feature information from at least one of the plural tile images by applying a feature transform to the at least one tile image, wherein the generating of the plural tile images from the first source image includes generating a first tile image and a second tile image by dividing the first source image into at least two corresponding portions, as the respective portions of the first source image, based on a horizontal resolution of the first source image such that there exists an overlapped region of the first tile image and the second tile image having a predetermined size.

The method may further include completing a writing of the generated first tile image to a buffer memory, having less capacity than the high-capacity short-term memory, even when a horizontal resolution of the first source image is greater than a horizontal capacity of the buffer memory.

The writing of the generated first tile to the buffer memory may be performed based on the buffer memory being SRAM memory and the reading of the respective portions of the first source image may be performed based on the high-capacity short-term memory being a DRAM memory.

The feature transform may be a scale-invariant feature transform (SIFT) algorithm.

The extracting of the feature information may include determining the at least one tile image to be at least one first octave and determining at least one first candidate feature from the determined at least one first octave, generating at least one second octave by downsizing the at least one first octave and determining a second candidate feature based on the determined at least one second octave, and extracting the feature information by comparing the determined first candidate feature to the determined second candidate feature.

The method may further include generating at least one reduced image by the downsizing of the at least one first octave, to generate a second source image by removing an overlapped region of the generated at least one reduced image, and to execute write processing of the generated second source image to the high-capacity short-term memory.

The method may further include generating at least one tile image from the second source image by reading respective portions of the second source image stored in the high-capacity short-term memory, wherein the determining of the second candidate feature includes determining the at least one tile image of the second source image to be a second octave and determining the second candidate feature of the second octave.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
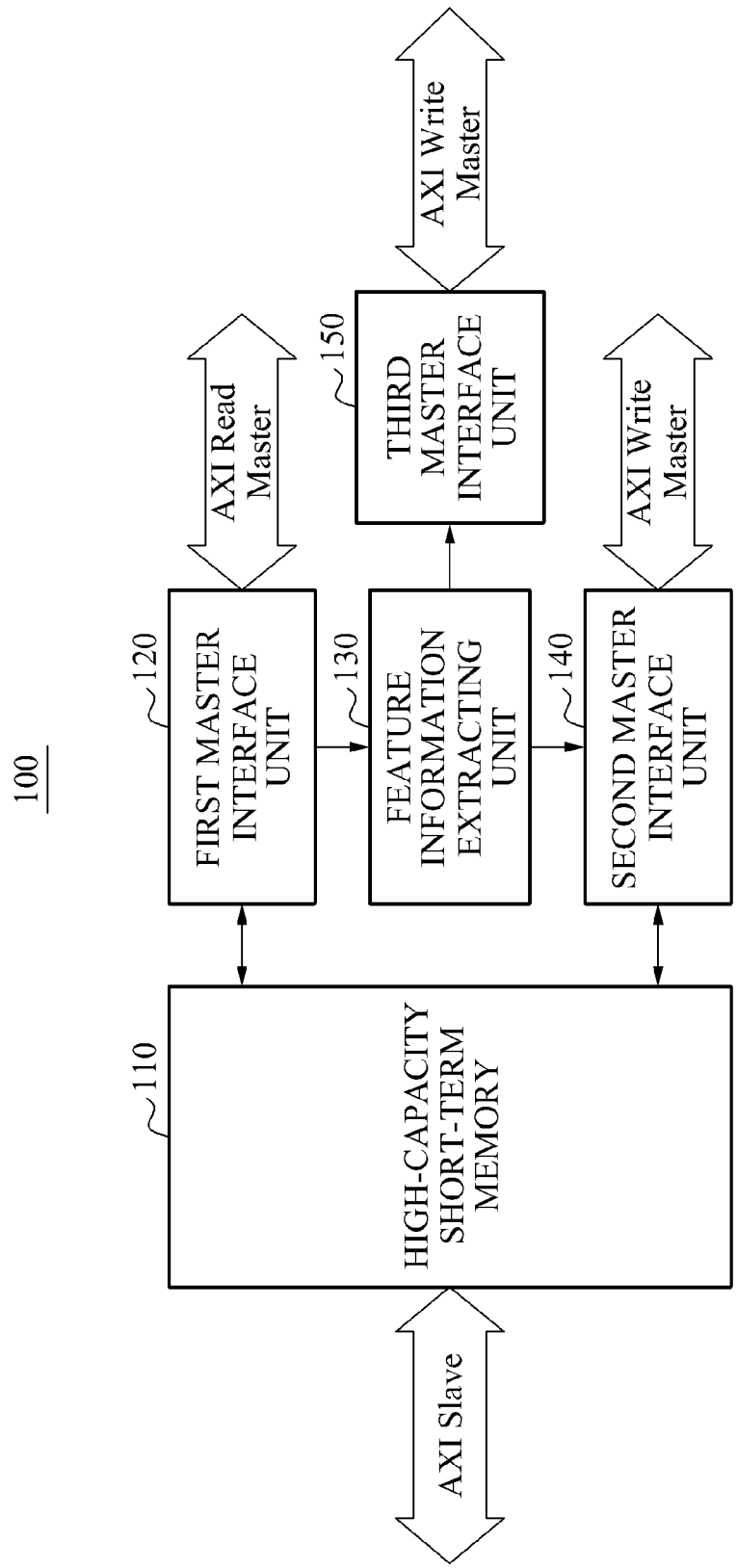
FIG. 1 illustrates an apparatus configured to extract feature information, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an apparatus 100 configured to extract feature information, according to one or more embodiments.

As only an example, the apparatus 100 configured to extract feature information may include a first master interface unit 120 configured to generate at least one tile image from a first source image stored in a high-capacity short-term memory 110, and a feature information extracting unit 130 configured to receive an input of the generated at least one tile image and to extract feature information from the generated at least one tile image, as only an example.

For example, the high-capacity short-term memory 110 may correspond to a type of a random access memory (RAM), and may be a dynamic RAM (DRAM) often used as a memory of a computer and the like. In one or more embodiments, the high-capacity short-term memory 110 may be used to store an entire source image.

The first master interface unit 120 may generate the at least one tile image by dividing the first source image based on a horizontal resolution of the first source image. Here, references to dividing a source image into at least one tile image based on the horizontal resolution, e.g., divisions of the source image to generate tile images with determined horizontal resolutions less than the full horizontal resolution of the source image, represent only an example and are not meant to limit embodiments. For example, the division of the source image may alternatively be based on a vertical resolution, or both the vertical and horizontal resolutions, or other considerations. The tile images may not be symmetrical or identically proportioned, though the tiling results in tile images having respectively smaller horizontal and/or vertical resolutions compared to the resolution of the source image. For example, such tiling is also not limited to divisions of the source image along only the horizontal and vertical axes.

Accordingly, in one or more embodiments, the at least one tile image may be an image split from the first source image.

The at least one tile image may be a partial image split from the first source image based on the horizontal resolution of the first source image.

That is, the first master interface unit 120 may generate a first tile image and a second tile image by vertically dividing the first source image based on the horizontal resolution of the first source image. The first and second tile images may be generated by reading corresponding image data of respective portions the first source image, e.g., image data for the first tile image and second tile image may be respectively read from the high-capacity short-term memory 110 in respective raster scanning approaches within each respective portion the first source image. In one or more embodiments, the first master interface 120 may write respective tile images to the same lower-capacity buffer sequentially for respective SIFT processing and/or to respectively to each of plural lower-capacity buffers, e.g., for sequential or parallel respective SIFT processing using each lower-capacity buffer. In one or more embodiments, the interface may be an AXI interface, e.g., operating according to an Advanced Microcontroller Bus Architecture (AMBA), such as when the apparatus configured to extract feature information is configured according an ARM architecture, as only an example. In one or more embodiments, the second and/or third master interface units 140 and 150 may similarly operate according to an AMBA architecture, such as when the apparatus configured to extract feature information is configured according to an ARM architecture. Here, in one or more embodiments, such an ARM architecture may include one or more cores, i.e., hardware processing elements.

In one or more embodiments, the first master interface unit 120 may generate the first tile image and the second tile image so that there is an overlapped region, in one or both of the first and second tile images, between the first tile image and the second tile image, e.g., with the overlapping region having a predetermined area.

The overlapped region may represent a margin for enabling extraction of feature information that is difficult to be extracted through a scale-invariant feature transform (SIFT) algorithm since the first tile image and the second tile image may be non-contiguous, depending on embodiment.

In one or more embodiments, the extracted feature information may be a descriptor.

In this instance, a third master interface unit 150 may be a master interface for storing the extracted feature information, e.g., a descriptor in a DRAM or an external high-capacity static random access memory (SRAM) buffer, for example, a scratch pad memory (SPM), as only examples. Here, the external high-capacity SRAM may be distinct from a buffer memory, e.g., which may be a lower-capacity SRAM, that a particular tile image is stored and read from for a respective SIFT processing. The apparatus 100 may include a controller to control any of the operations of the first master interface unit 120, the feature information extractor unit 130, and/or the second master interface unit 140. The controller may be represented in any of the first master interface unit 120, the feature information extractor unit 130, or the second master interface unit 140, or as a separate controller unit of the apparatus 100.

A detailed description of at least one tile image, a first tile image, a second tile image, and a source image is provided below with reference to FIG. 2, according to one or more embodiments.

Figure 2:
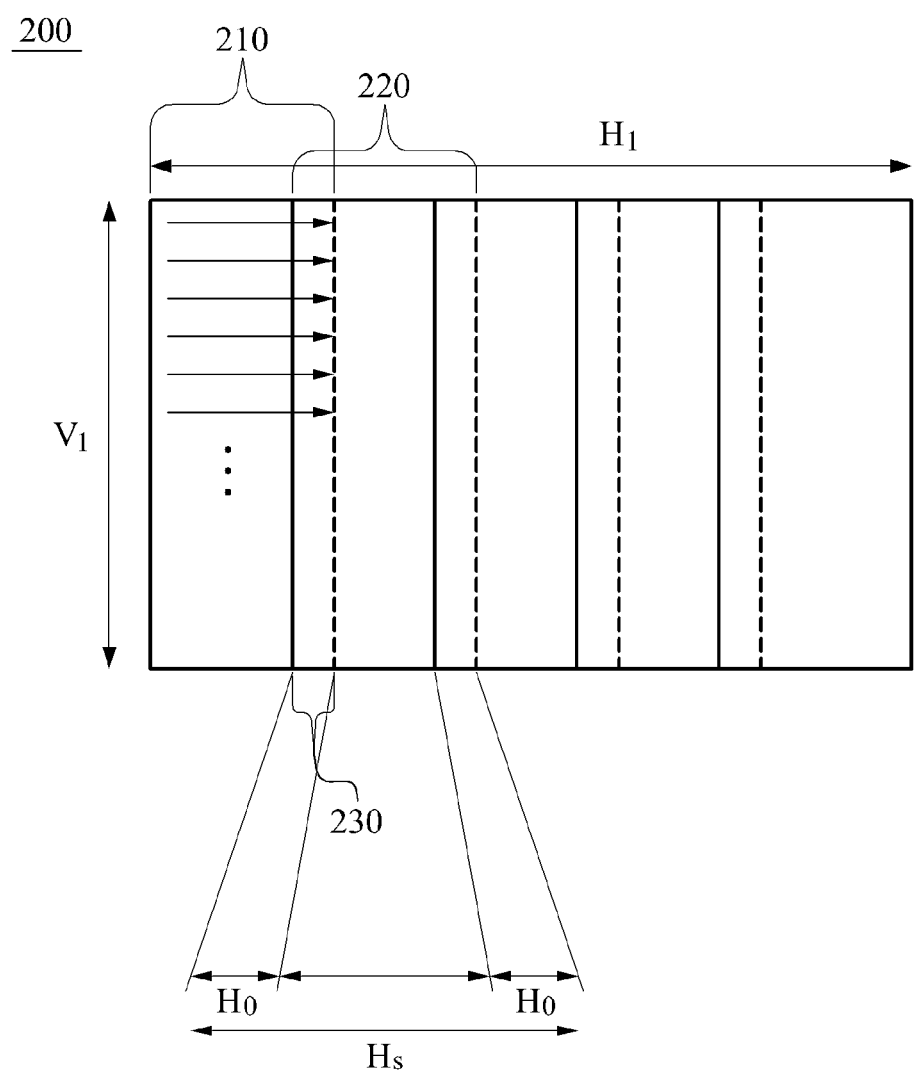
FIG. 2 illustrates a dividing of a source image into at least one tile image, according to one or more embodiments.

FIG. 2 illustrates a dividing of a source image 200 into at least one tile image, according to one or more embodiments.

As shown in FIG. 2, as only an example, the source image 200 may be an image having a resolution of '$H_1 \times V_1$'.

Thus, the source image 200 may have a horizontal resolution $H_1$ and a vertical resolution $V_1$.

In an embodiment, respective portions of the source image 200 may be read, e.g., from a high capacity memory, to generate a first tile image 210 and a second tile image 220 by the first master interface unit, as only an example.

In one or more embodiments, the first tile image 210 and the second tile image 220 may include a common image or image information in an overlapped region 230 having a width $H_o$.

That is, the first master interface unit may divide the source image 200 into the first tile image 210 and the second tile image 220 such that the overlapped region 230 having a width $H_o$ is formed, as only an example.

Similarly, the first master interface unit may divide the source image 200 into other tile images such that respective overlapped regions 230 having a width $H_o$ are formed.

The first tile image 210 and the second tile image 220 may each correspond to a partial image of the source image 200.

The common image data of the first tile image 210 and the second tile image 220 may be represented in the overlapped region 230 having the width $H_o$.

The first tile image 210 may include a non-overlapping image in an area corresponding to a horizontal resolution of $H_s - H_o$.

The second tile image 220 may include a non-overlapping image in an area corresponding to a horizontal resolution of $H_s - 2H_o$.

Referring to FIG. 1, in one or more embodiments, the feature information extracting unit 130 may extract, as the feature information, at least one of a feature location of the at least one tile image and a corresponding descriptor corresponding to the feature location, as only an example.

In one or more embodiments, the feature information extracting unit 130 may use an SIFT algorithm to generate a feature location and the descriptor corresponding to the generated feature location from the at least one tile image.

Here, the feature information extracting unit 130 may determine the at least one input tile image to be at least one first octave.

Also, the feature information extracting unit 130 may generate at least one Gaussian image by convolving the at least one first octave with a Gaussian filter.

The feature information extracting unit 130 may further generate the Gaussian image from the first octave and the Gaussian filter using the below Equation 1, for example.

$$L(x, y, \sigma) = G(x, y, \sigma) \otimes I(x, y) \quad \text{Equation 1}$$

Here, $L(x, y, \sigma)$ may denote a Gaussian image, $G(x, y, \sigma)$ as a Gaussian filter, and $I(x, y)$ as at least one input tile image, that is, a first octave.

In this instance, the feature information extracting unit 130 may generate at least one Gaussian image by changing a sigma value of $\sigma$ in the Gaussian filter to change a degree of blur.

The sigma value of $\sigma$ in the Gaussian filter may denote a plurality of predetermined standard deviation coefficient values for an input image, that is, the source image.

That is, the feature information extracting unit 130 may generate $L(x, y, \sigma)$ by convolving $G(x, y, \sigma)$ with $I(x, y)$ with a change in the sigma value of $\sigma$ in the Gaussian filter.

For example, the initial sigma value of $\sigma$ the Gaussian filter may be determined to be 1.6, and the at least one Gaussian image may be generated by changing the initial sigma value of $\sigma$ in the Gaussian filter by a factor of $\sqrt{2}$.

Also, the feature information extracting unit 130 may generate $G(x, y, \sigma)$ using Equation 1 as shown in the below Equation 2, for example.

Equation 2:

$$G(x, y, \sigma) = \frac{1}{2\pi\sigma^2} e^{\frac{-(x^2+y^2)}{2\sigma^2}}$$

Here, $G(x, y, \sigma)$ may denote a Gaussian filter, x and $y$ as location information of an input octave, and $\sigma$ as information for changing a degree of blur of a Gaussian image.

The feature information extracting unit 130 may generate at least one difference of Gaussians (DoG) image from the at least one Gaussian image generated.

For example, the feature information extracting unit 130 may generate the DoG image using the below Equation 3, for example.

That is, the feature information extracting unit 130 may generate the at least one DoG image using a difference between the at least one Gaussian image generated, for each octave.

$$D(x, y, \sigma) = (G(x, y, k\sigma) - G(x, y, \sigma)) \otimes I(x, y) \quad \text{Equation 3}$$

Here, $D(x, y, \sigma)$ may denote a DoG image at a location of a tile image indicated by x and $y$ input.

$G(x, y, k\sigma)$ and $G(x, y, \sigma)$ may denote a Gaussian filter used in generating a Gaussian image. In this instance, $G(x, y, k\sigma)$ may denote a Gaussian filter having a sigma value of $k\sigma$, and $G(x, y, \sigma)$ may denote a Gaussian filter having a sigma value of $\sigma$.

$G(x, y, k\sigma)$ may denote a Gaussian filter for generating a Gaussian image contiguous to a Gaussian image generated using $G(x, y, \sigma)$.

$k$ may denote a constant for changing a degree of blur of a Gaussian image generated by increasing a sigma value of a Gaussian filter by a predetermined number.

$I(x, y)$ may denote at least one input tile image, that is, a first octave.

Accordingly, in one or more embodiments, the feature information extracting unit 130 may generate a DoG image corresponding to a first octave using the example Equations 1 through 3, and may extract a first candidate feature from the generated DoG image.

Accordingly, in one or more embodiments, the feature information extracting unit 130 may generate a DoG image corresponding to a second octave using the example Equations 1 through 3, and may extract a second candidate feature from the generated DoG image.

The feature information extracting unit 130 may extract a candidate feature for each of a predetermined number of octaves, and may extract feature information from the extracted candidate features.

That is, the feature information extracting unit 130 may determine the at least one input tile image to be at least one first octave, and may extract a first candidate feature from the determined at least one first octave.

Also, the feature information extracting unit 130 may downsize the at least one first octave to generate a reduced image.

The feature information extracting unit 130 may read a second source image generated from the reduced image using at least one tile image split from the second source image, and may generate the at least one tile image, split from the second source image, read as a second octave.

The feature information extracting unit 130 may determine a second candidate feature based on the generated at least one second octave, and may extract the feature information by comparing the determined first feature to the determined second feature.

In this instance, the second octave may be at least one tile image generated by synthesizing each pair of predetermined reduced images among reduced images generated by downsizing the at least one first octave.

The second source image may be an entire image generated by synthesizing at least one tile image included in the second octave and removing an overlapped region of the at least one tile image, for example.

That is, in one or more embodiments, the second source image may be an image generated by reducing the horizontal resolution and the vertical resolution of the first source image at a predetermined ratio.

For example, the second source image may be an image generated by reducing each of the horizontal resolution and the vertical resolution of the first source image by a factor of one half.

According to one or more embodiments, an apparatus configured to extract feature information may further include a second master interface unit 140 to generate the second source image by downsizing the first source image, as only an example.

The second master interface unit 140 may generate at least one reduced image by downsizing the at least one first octave.

Also, in one or more embodiments, the second master interface unit 140 may generate the second source image by removing an overlapped region of the generated at least one reduced image, and may execute write processing of the generated second source image to the high-capacity short-term memory 110, for example.

A second source image generated by such a second master interface unit 140 is described in further detail with reference to FIG. 3.

Figure 3:
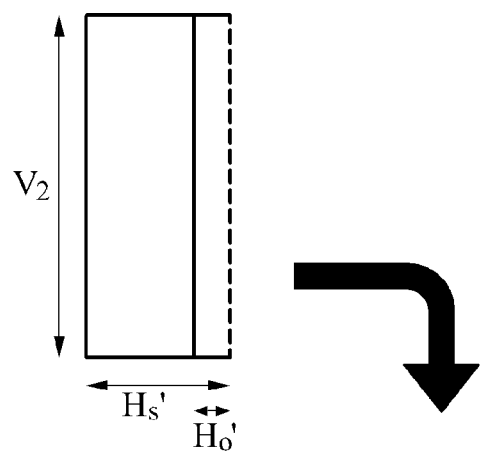
FIG. 3 illustrates a downsizing, synthesizing, and write processing of at least one tile image from which a candidate feature is extracted using a scale-invariant feature transform (SIFT) algorithm, according to one or more embodiments.
Figure 3:
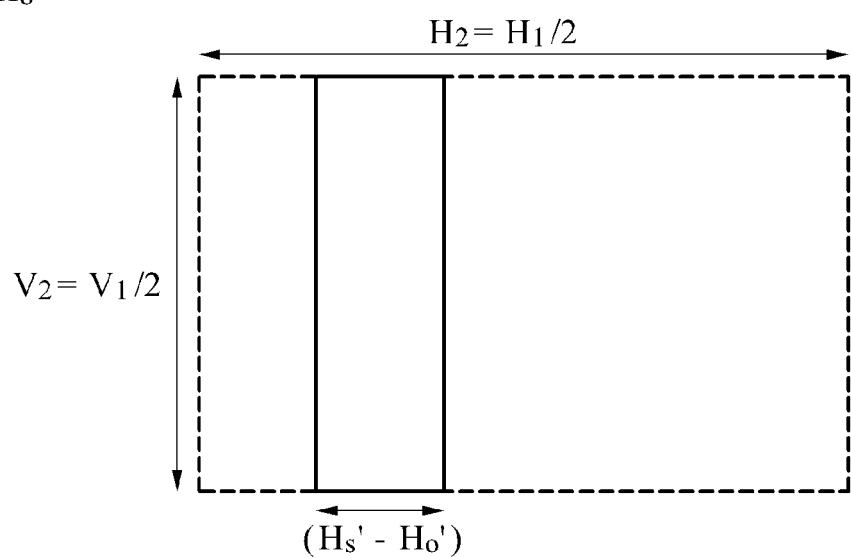

FIG. 3 illustrates a downsizing, synthesizing, and write processing of at least one tile image from which a candidate feature is extracted using an SIFT algorithm, according to one or more embodiments.

The second master interface unit 140, as only an example, may receive an input of at least one second octave.

That is, the second master interface unit 140 may generate at least one reduced image 310 by downsizing at least one first octave.

The reduced image 310 may be a set of at least one tile image having a horizontal resolution and a vertical resolution reduced to one half of those of the at least one tile image of the first source image.

That is, the reduced image 310 may have a horizontal resolution $H_s'$ and a vertical resolution $V_2$.

The second master interface unit 140 may generate a second source image 320 by synthesizing the at least one reduced image 310 generated by downsizing each of the at least one tile image of the first source image.

The second source image 320 may have the horizontal resolution $H_2$ of $H_1/2$ and the vertical resolution $V_2$ of $V_1/2$ since the second source image 320 is generated by reducing the horizontal resolution and the vertical resolution of the first source image to half, for example.

The second master interface unit 140 may generate the second source image 320 based on an overlapped region of the reduced image 310 and another contiguous reduced image, for example.

In one or more embodiments, the second master interface unit 140 may generate the second source image 320 by synthesizing the at least one reduced image 310 and removing an overlapped region corresponding to a horizontal resolution $H_o'$ in each of the at least one reduced image 310 to prevent a double overlapped region from being formed.

That is, when the second master interface unit 140 synthesizes the at least one reduced image 310, a horizontal resolution of each of the at least one reduced image 310 used in synthesizing actually may be $H_s'-H_o'$.

For example, in a case of a processable capacity of a line buffer, distinct from the high-capacity short-term memory 110, in the apparatus 100 configured to extract feature information corresponding to the horizontal resolution $H_s$ of the first source image, when the processable capacity of the line buffer in the apparatus 100 configured to extract feature information corresponds to $H_s$, a synthesized image of the two reduced images 310 may correspond to the tile image of the second source image 320 by a relational expression $H_s=2Hs'$.

That is, tile images of different source images may have the same horizontal resolution. This may be due to a horizontal resolution of a tile image being determined based on the capacity of the line buffer, as only an example.

The first master interface unit 120 may generate at least one tile image from the second source image stored in the high-capacity short-term memory 110.

The feature information extracting unit 130 may receive an input of the at least one tile image generated from the second source image 320 and may determine the second candidate feature.

In this instance, the at least one tile image generated from the second source image 320 may be a second octave.

The second octave may be a set of the tile images split from the second source image 320, e.g., corresponding to the processable capacity of the line buffer. In an embodiment, the horizontal resolution of the at least one tile image included in the first octave may be equal to that of the at least one tile image included in the second octave.

The feature information extracting unit 130 may generate candidate features including a first candidate feature and a second candidate feature, iteratively, a predetermined number of times, and may extract feature information from the generated candidate features.

The feature information extracting unit 130 may extract, as the feature information, at least one of a feature location of the at least one tile image and a descriptor corresponding to the feature location.

Accordingly, the apparatus 100 configured to extract feature information may be represented by hardware configured to process an SIFT algorithm, e.g., irrespective or independent of increasing resolutions of source images. For example, even if the underlying line buffer(s) have fixed widths, e.g., fixed capacity, the apparatus 100 configured to extract feature information can still process source images with variable resolutions, including a source image having a horizontal resolution greater than the fixed width of the corresponding line buffer. For example, even if the underlying line buffer has a fixed width, a greater resolution source image may be divided into appropriately sized tile images so the source image can still be processed using the limited capacity line buffer.

Also, the apparatus 100 configured to extract feature information may process a high-resolution image absent expansion of SRAM capacity, e.g., as an example of the above referenced line buffer, by using both the SRAM to store an example tile image and a DRAM to store an entire image from which the tile image is generated.

Also, the apparatus 100 configured to extract feature information may enable image processing by reading partial images, corresponding to respectively available SRAM capacity, iteratively from the DRAM storing the entire image.

Figure 4:
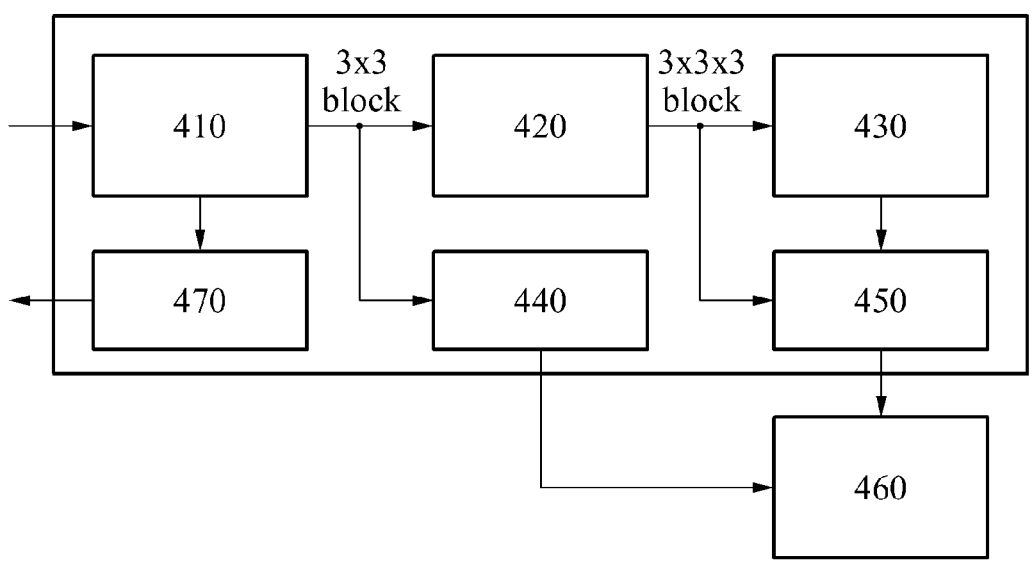
FIG. 4 illustrates a feature information extracting unit, according to one or more embodiments.

FIG. 4 illustrates a feature information extracting unit 400, according to one or more embodiments.

The feature information extracting unit 400 may divide a source image in a horizontal direction into at least one tile image having a size processable by a core, may read the at least one tile image, and may generate feature information from the read at least one tile image.

The feature information extracting unit 400 may include a Gaussian image generating unit 410, a DoG image generating unit 420, a candidate feature location calculating unit 430, a data collecting unit 440, a feature determining unit 450, a descriptor generating unit 460, and a downsizer 470, for example.

The Gaussian image generating unit 410 may generate a Gaussian image by reading the at least one tile image split from the source image as a first octave.

The Gaussian image generating unit 410 may generate the at least one Gaussian image by convolving the at least one input tile image with a Gaussian filter.

The at least one Gaussian image may be generated by changing a sigma value of the Gaussian filter to change a degree of blur.

The DoG image generating unit 420 may generate at least one DoG image from the at least one Gaussian image generated.

That is, the DoG image generating unit 420 may generate the at least one DoG image using a difference between the at least one Gaussian image generated, for each octave.

The candidate feature location calculating unit 430 may generate candidate features from the at least one DoG image generated.

The data collecting unit 440 may obtain data necessary to generate a descriptor from the generated Gaussian image.

The feature determining unit 450 may extract a feature by extracting only a determined robust feature(s) among the candidate features generated by the candidate feature location calculating unit 430.

The descriptor generating unit 460 may generate a descriptor using the data necessary to generate the descriptor obtained by the data collecting unit 440 and the feature extracted by the feature determining unit 450.

In this instance, the descriptor to be generated may be feature information used herein.

The downsizer 470 may downsize an octave read from the source image at a predetermined ratio to generate a reduced image, and may output the reduced image.

After the reduced image is output, the reduced image may experience synthesis based on an overlapped region, and may be recorded as a second source image in the high-capacity short-term memory, for example, a DRAM.

Figure 5:
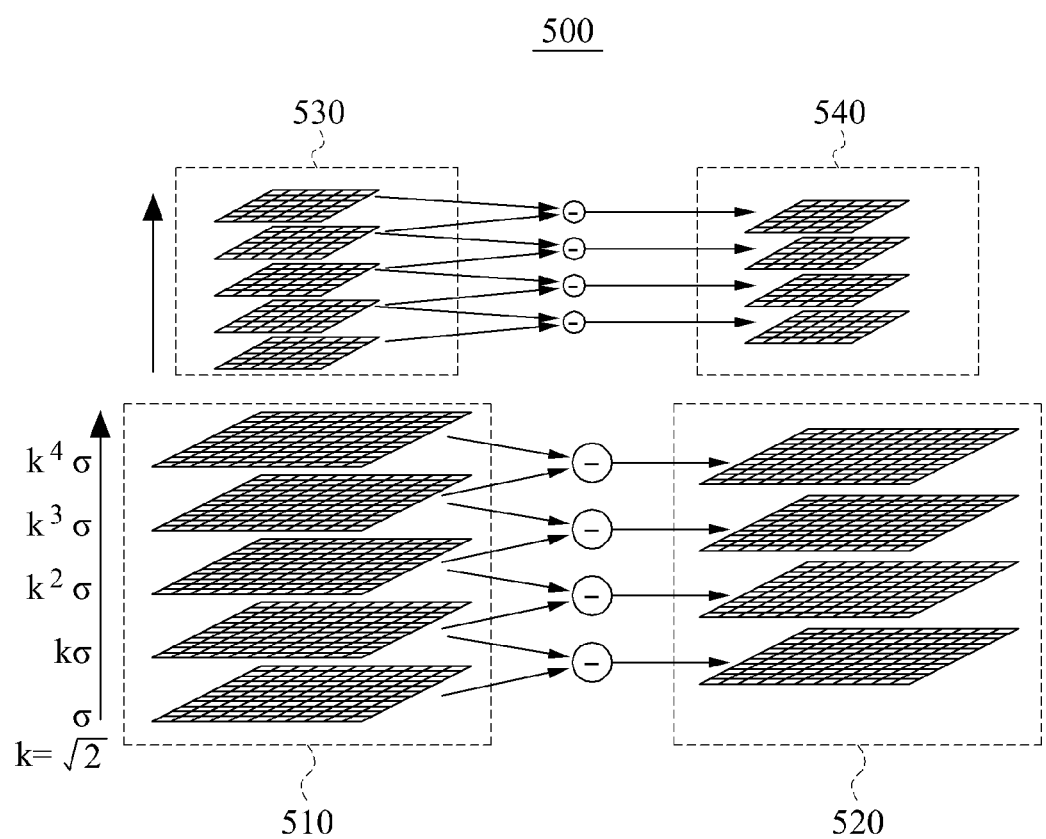
FIG. 5 illustrates a Gaussian image and a Difference of Gaussians (DoG) image generated for each octave by a feature information extracting unit, according to one or more embodiments.

FIG. 5 illustrates a Gaussian image and a DoG image generated for each octave by a feature information extracting unit, such as the feature information extracting unit 130 of FIG. 1, according to one or more embodiments.

A source image may be divided into at least one tile image based on a capacity of a line buffer.

A set of the at least one tile image may be a first octave.

The first octave may be convolved with a Gaussian filter to generate at least one Gaussian image 510.

The at least one Gaussian image 510 may be generated by convolving the at least one tile image included in the first octave with the Gaussian filter.

The at least one Gaussian image 510 may be generated by convolving the first octave with a value of sigma ($\sigma$) of the Gaussian filter while changing the signal value $\sigma$ in a sequential order.

That is, the sigma value may have an initial value of $\sigma$ and may be changed in a sequential order through being increased by a factor of $k$.

Here, $k$ may correspond to a constant for changing a degree of blur of a Gaussian image by increasing a value of sigma in a Gaussian filter by a predetermined factor, and may be, for example, $\sqrt{2}$.

The feature information extracting unit 130 may generate at least one DoG image 520 from the Gaussian image 510 generated from the first octave, and may extract a first candidate feature from the DoG image 520.

The feature information extracting unit 130 may generate a Gaussian image 530 of a second octave read from a second source image, generated by being downsized by a factor of one half, may generate at least one DoG image 540 from the generated Gaussian image 530 of the second octave, and may extract a second candidate feature from the generated at least one DoG image 540.

The feature information extracting unit 130 may generate feature information from the extracted first candidate feature and the extracted second candidate feature.

Figure 6:
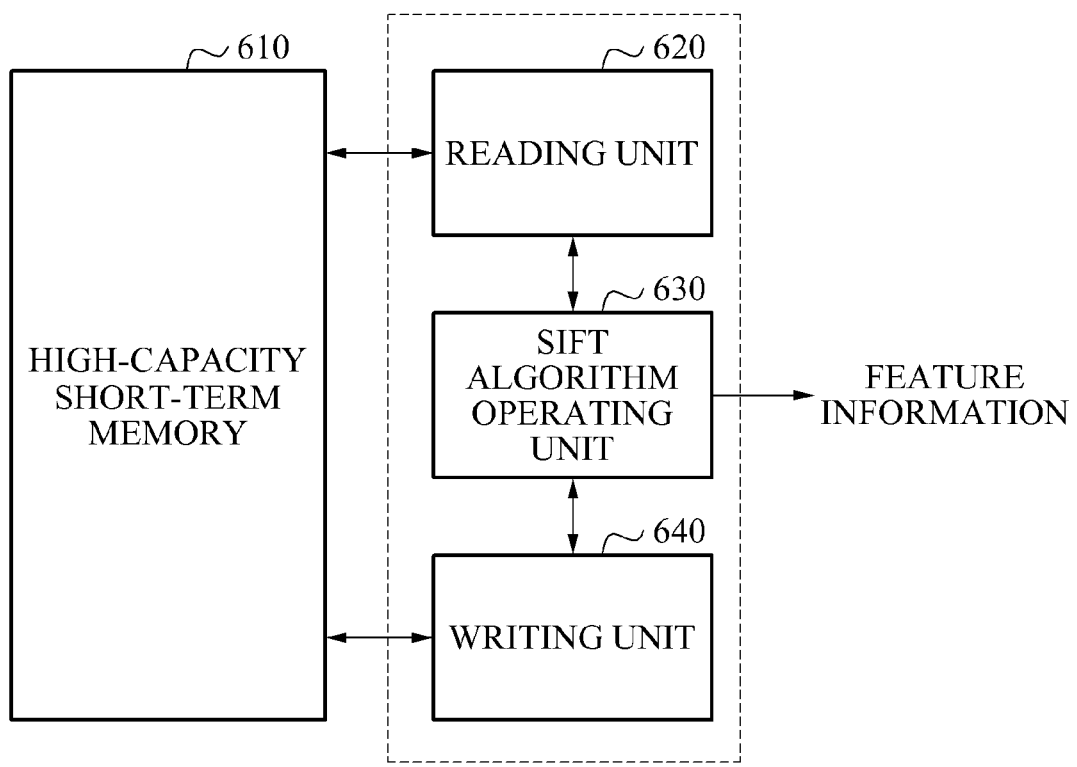
FIG. 6 illustrates an apparatus configured to extract feature information, according to one or more embodiments.

FIG. 6 illustrates an apparatus 600 configured to extract feature information, according to one or more embodiments.

The apparatus 600 configured to extract feature information may include a reading unit 620, an SIFT algorithm operating unit 630, and a writing unit 640, as only an example.

The reading unit 620 may read at least one first tile image split from a first source image stored in a high-capacity short-term memory, for example.

The SIFT algorithm operating unit 630 may generate a first candidate feature by applying an SIFT algorithm to the read at least one first tile image, and may output at least one second tile image by downsizing the at least one first tile image.

The writing unit 640 may generate a second source image by synthesizing the at least one second tile image output and executing write processing of the generated second source image to the high-capacity short-term memory, for example.

Also, the reading unit 620 may read at least one second tile image split from the second source image.

Also, the SIFT algorithm operating unit 630 may generate a second candidate feature from the read at least one second tile image, and may generate feature information based on the generated first candidate feature and the generated second candidate feature.

Conventionally, a size of an image to be processed may present an obstacle in implementation of the SIFT algorithm through hardware, e.g., as available buffer capacities may be fixed.

That is, conventionally the SIFT algorithm may be applied to a DoG image, multi-octave, and multi-scale, and thus, an increase in a size of an image to be processed may present a significant obstacle, e.g., because the capacity of the available buffer cannot be increased commensurate with the needed capacity for processing the increased size image. In addition, in this instance, the octave may correspond to a size of an image, and the scale may be a size in which the Gaussian filter is applied to the image.

To extract a feature location, the reading unit 620 of the apparatus 600 configured to extract feature information may read the source image stored in the high-capacity short-term memory to generate a tile image having a predetermined size, as only an example. Here, in one or more embodiments, the size of the tile image may be predetermined to have a horizontal resolution smaller than or equal to a capacity of a corresponding buffer that is used while performing the SIFT algorithm. The horizontal resolution of all tile images, regardless of the resolution of a source image, may also be fixed, or the horizontal resolution of a tile image determined for one resolution source image may be different from the horizontal resolution of a tile image determined for a different resolution source image.

That is, the reading unit 620 may read a first source image using at least one first tile image split from the first source image based on a horizontal resolution of the first source image and may read a second source image using at least one second tile image split from the second source image based on a horizontal resolution of the second source image. In one or more embodiments, the resolution of a source image may be determined before the source image is divided into one or more tile images, and when the resolution of the source image is determined to be smaller than or equal to a capacity of a corresponding buffer that is used while performing the SIFT algorithm the source image may selectively not be divided into tile images, or a single tile image may be generated to represent the entire source image, as only an example. Alternatively, a source image may always be divided into more than one tile image, as only an example.

In this instance, the reading unit 620 may read each of the at least one first tile image or each of the at least one second tile image, each read/generated from the first source image, to form an overlapped region having a predetermined area, e.g., such as demonstrated in FIG. 2.

The SIFT algorithm operating unit 630 may generate at least one Gaussian image by applying a Gaussian filter having a plurality of predetermined standard deviation coefficient values to the read tile image.

Also, the SIFT algorithm operating unit 630 may generate at least one DoG image using a difference between the at least one Gaussian image generated.

Also, the SIFT algorithm operating unit 630 may find an initial feature location in the generated DoG image and may extract only a determined robust feature.

One of the generated Gaussian images may be downsized and may be used as an input image of a next octave.

Figure 7:
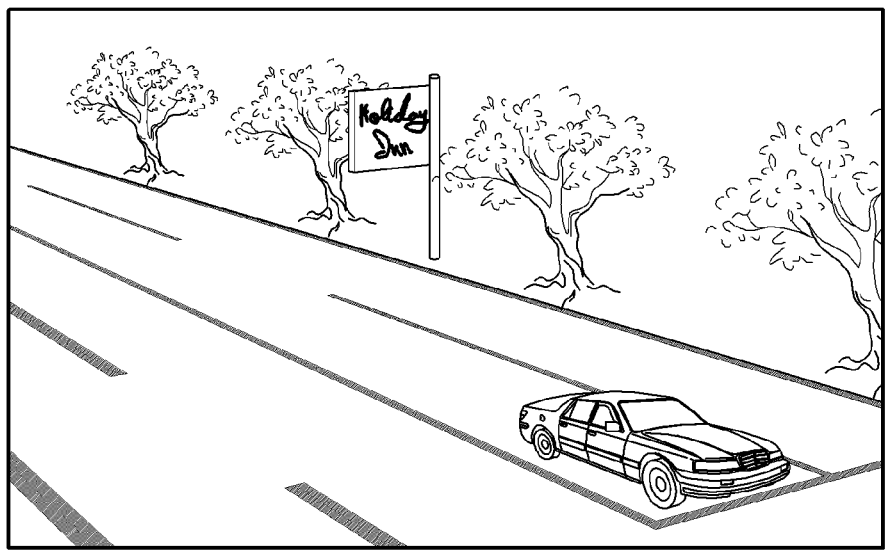
FIG. 7 illustrates a source image, according to one or more embodiments.

FIG. 7 illustrates a source image 700, according to one or more embodiments.

As only an example, in an embodiment, the source image 700 may correspond to a high-capacity image having a resolution of 1600 (horizontally)×1200 (vertically).

According to one or more embodiments, an apparatus configured to extract feature information may multi-frame post-process a high-definition high-capacity image such as the source image 700 in semi or real time with a low hardware cost, as only an example. In one or more embodiments, with plural tile images of a source image, each of plural distinct hardware processing elements may have access to a respective one tile image, in which case the SIFT processing of the source image may be performed in parallel by each of the processing elements for their respective one tile image, i.e., plural tile images for a source image may be processed simultaneously. Alternatively, such processing may be performed sequentially, through a predetermined ordering of such plural hardware processing elements or sequentially using a single hardware processing element.

According to one or more embodiments, an apparatus configured to extract feature information may enable partitioned image processing in a horizontal direction by reading an image corresponding to an allowable SRAM capacity iteratively from image information of an entire image stored in a DRAM, e.g., so such a particular SRAM associated with a particular processing element may store a particular partitioned image, or tile image, of a source image while the DRAM may store the entire source image, as only an example. Thus, in one or more embodiments, due to the implementation of partitioned image processing, feature information may be extracted by applying an SIFT algorithm to an image having an arbitrary size or resolution.

Accordingly, according to one or more embodiments, an apparatus configured to extract feature information may divide the source image 700 into tile images by reading each of the tile images from respective portions of the source image 700 stored in the DRAM, e.g., each being read into a single particular buffer for sequential processing of the tile images, or distinctly into respective buffers for sequential or parallel processing of each of the tile images.

Figure 8:
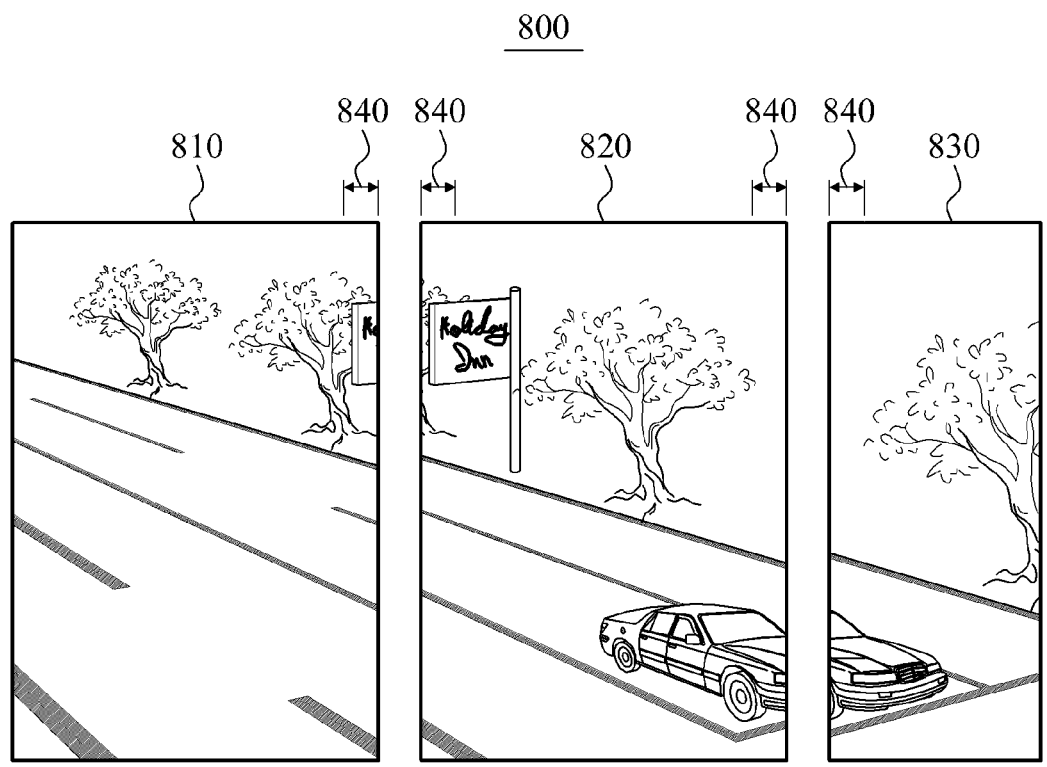
FIG. 8 illustrates plural tile images generated from a source image, such as the source image of FIG. 7, according to one or more embodiments.

FIG. 8 illustrates plural tile images 800 generated from a source image, such as source image 700 of FIG. 7, according to one or more embodiments.

The plural tile images 800 may include a first tile image 810, a second tile image 820, and a third tile image 830, for example.

As only an example, when the source image 700 has a resolution of 1600×1200, the source image 700 may be divided into the first tile image 810 corresponding to a horizontal resolution of 666, the second tile image 820 corresponding to a horizontal resolution of 666, and the third tile image 830 corresponding to a horizontal resolution of 333. In this instance, a horizontal resolution of an overlapped region 840 between each tile image may be determined to be 13.

A particular hardware processing element, e.g., an SIFT core, may read respective tile images sequentially from a high-capacity memory storing the source image 700 or may read less than all tile images sequentially from the high-capacity memory storing the source image 700, and may output a descriptor and a reduced image. Here, such reading of the tile images, whether sequentially read or read in parallel by respective hardware processing elements, are not necessarily performed in a left to right order, as illustrated, of the divided source image 700. In addition, when there are plural hardware processing elements available, if the number of available hardware processing elements is the same as the number of tile images for the source image 700, each processing element may respectively perform processing on a separate distinct tile image of the source image 700. Further, if the number of available hardware processing elements is less than the number of tile images for the source image 700, then one or more of the hardware processing elements may sequentially perform SIFT processing on different tile images of the source image 700 while some of the tile images of the source image would have also been parallel processed by the available hardware processing elements, for example. Still further, if the number of available hardware processing elements is greater than the number of tile images of the source image 700, or is greater than a predetermined or preliminarily determined number of tile images of the source image 700, then less than all of the available hardware processing elements may need to be reserved or used to perform SIFT processing, or they may be used for subsequent SIFT processing, or the predetermined or preliminary determined number of tile images, and corresponding horizontal resolutions, may be changed. Here, alternate embodiments are equally available for respective horizontal resolutions of the tile images, number of tile images, and differing ways of performing SIFT processing with one or more hardware processing elements with each respective tile image.

In one or more embodiments, the output descriptor(s) may be stored in an external high-capacity SRAM buffer, for example, SPM, through a third master interface unit.

The output reduced image having a horizontal resolution and a vertical resolution reduced to half of those of the source image 700 may be stored in a DRAM, as only an example. In one or more embodiments this DRAM may be the same memory that the source image 700 is read from for respective SIFT processing of the tile images of the source image 700.

Accordingly, the source image 700 may be processed by using an SIFT algorithm irrespective or independent of a resolution of the image, by reading the source image 700 through sequential and/or parallel reads of tile images of the source image 700, e.g., from the example DRAM.

To ultimately read all portions of the source image 700 to generate the respective tile images, one or more example SIFT cores may be operated iteratively an R number of times, as shown below in Equation 4, for example.

$$R = [H/(H_F + 2H_O)] \qquad \text{Equation 4}$$

Here, H may be denote a horizontal resolution of a source image, V may be denote a vertical resolution of a source image, $H_F$ may be denote a horizontal resolution where features could be found by an SIFT core, and $H_o$ may be denote a width of an area in which tile images are overlapped, that is, an overlapped region, e.g., to be filtered.

In the source image, a first tile image read from the DRAM in a horizontal direction may be in a range of 1 to $(H_F-H_o)$, e.g., read in a raster scanning approach, where, similar to the illustration of FIG. 2, the horizontal position of an illustrated left most horizontal image data is represented by the 1, the horizontal position of an illustrated right most position of the first tile image is represented by $H_F$, and $H_o$, represents the horizontal width of the overlapped region. Alternate approaches for accessing the respective image data for each tile image from the source image, i.e., alternate to the example raster scanning approach, are equally available.

Similarly, a second tile image contiguous to the first tile image may be read from the DRAM in a horizontal direction may be in a range of $(H_F-3H_o)$ to $(2 H_F-H_o)$, e.g., read in a raster scan approach within this range of the second tile image.

An Nth tile image read from the DRAM in a horizontal direction may be in a range of $((N-1)*(H_F-2H_o)-H_o)$ to $(N*(H_F-2H_o)+H_o)$.

Still further, an ultimate Rth tile image read from the DRAM in a horizontal direction may be in a range of $((R-1)*(H_F-2H_o)-H_o)$ to $(H)$, where H represents an example last horizontal position of the source image.

In this instance, each tile image read in a vertical direction may be in a range of 1 to V, where V represents an example last vertical position of the source image. Here, again, though alternative reading approaches are available, each tile image may be read in the vertical direction through a raster scan approach according to the respective horizontal ranges. In one or more example embodiments, the vertical resolution of a tile image may always be equal V, though in alternative embodiments the vertical resolution of the tile image may be less than V, e.g., where there may be plural tiles generated in the vertical direction.

Figure 9:
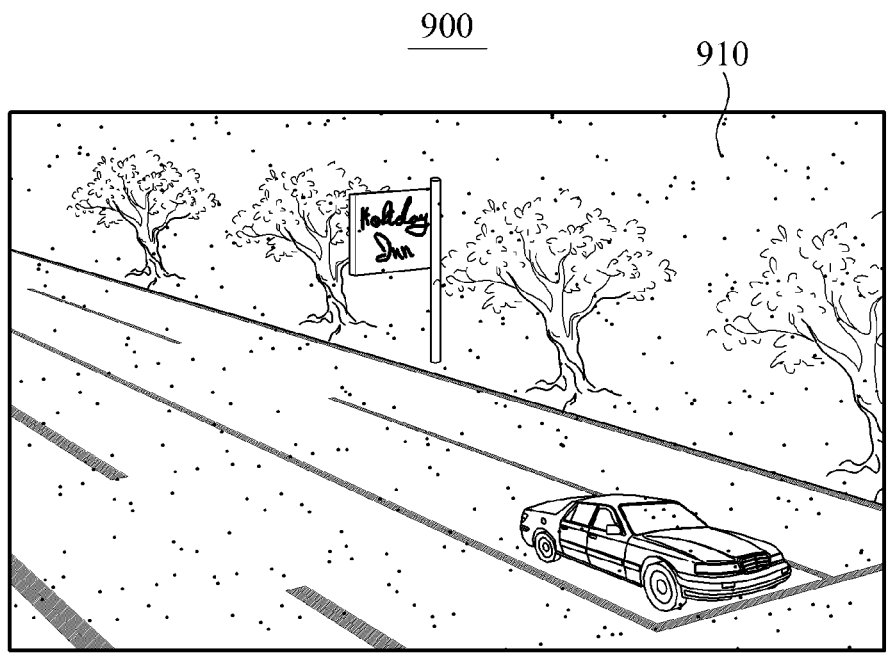
FIG. 9 illustrates at least one feature information detected in a source image using at least one tile image, according to one or more embodiments.

FIG. 9 illustrates at least one feature information 910 detected in a source image 900 using at least one tile image.

The extracted feature information 910 in the source image 900 may include a feature location and information about the feature location.

In one or more embodiments, the feature information 910 may have robust properties against changes in illumination, rotation, scaling, and point of view, as only examples. The feature information 910 may be scale-invariant. Accordingly, image processing using the feature information 910 may be widely used for matching between at least two images. Respective feature information 910 from different tile images may equally be widely used for such matching between the source image and another image. The other image may also have been be divided into different tile images.

Figure 10:
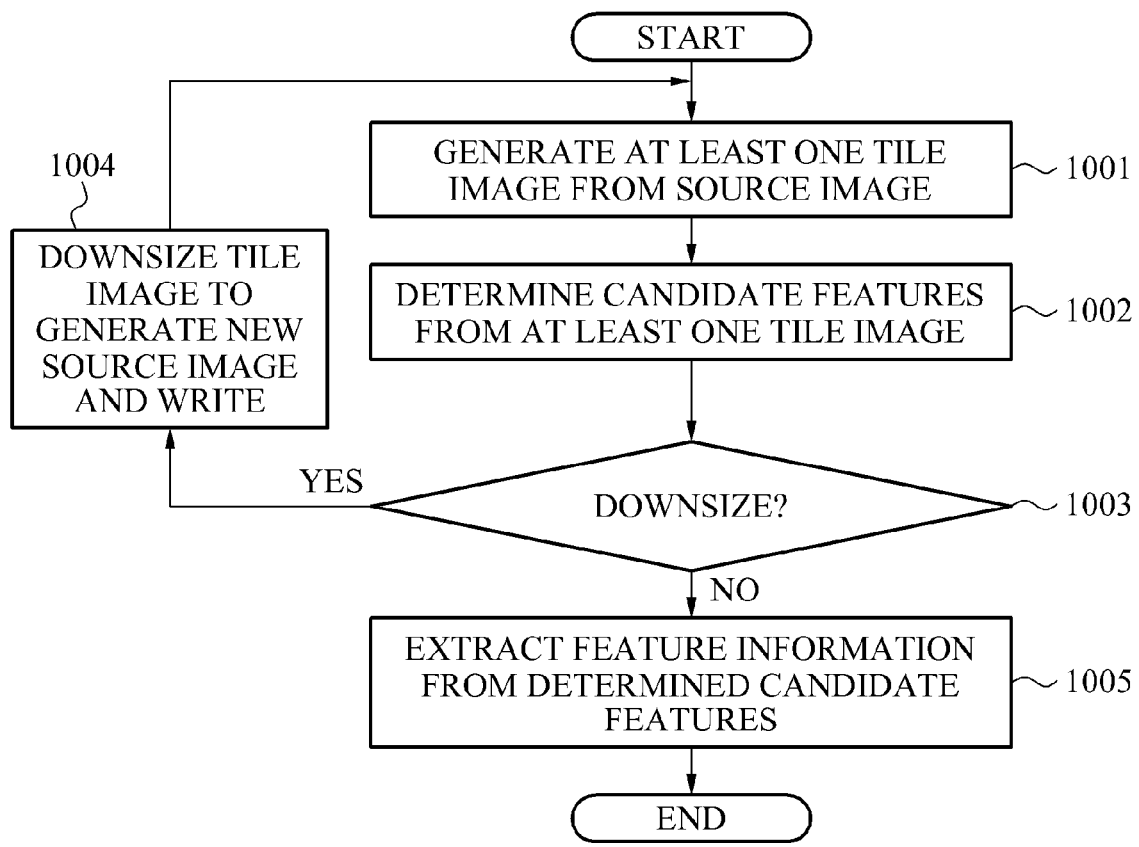
FIG. 10 illustrates a method of extracting feature information, according to one or more embodiments.

FIG. 10 illustrates a method of extracting feature information, according to one or more embodiments.

In operation 1001, at least one tile image may be generated from a first source image stored in a high-capacity short-term memory, for example. The at least one tile image may be stored in a respective buffer distinct from the high-capacity short-term memory.

In operation 1002, an input of the generated at least one tile image may be received and candidate features may be determined from the at least one input tile image.

That is, the at least one input tile image may be determined to be at least one first octave, and a first candidate feature may be determined from the determined at least one first octave.

In operation 1003, whether the source image is downsized iteratively a predetermined number of times may be verified, and whether to downsize again may be determined.

In operation 1004, when it is determined to execute downsizing, the at least one first octave may be downsized to generate at least one reduced image, and the generated at least one reduced image may be synthesized to generate a new source image.

In this instance, the new source image may be generated based on an overlapped region of the generated at least one reduced image.

The at least one tile image generated from the new source image may be generated as a second octave in operation 1001. Also, a second candidate feature may be determined from the second octave in operation 1002.

When the repeated number of times of downsizing reaches the predetermined number of times, for example, it may be determined to stop downsizing in operation 1003.

In operation 1005, feature information may be extracted from the determined candidate features for the input tile image, i.e., for the corresponding portion of the first source image.

A conventional hardware system using an SIFT algorithm extracts a feature from only an image having a limited resolution, i.e., with the resolution of the image being limited to the width of a line buffer accessed during implementation of the SIFT algorithm. As images having higher resolutions become available, e.g., with improvement in performance of a camera, high definition image processing may become indispensable. Accordingly, as explained herein, a hardware structure for implementing an SIFT algorithm irrespective or independent of resolution of an image may become a very desirable element in high definition image processing.

One or more embodiments may include an apparatus and method for extracting feature information that may process an image having an arbitrary resolution using an SIFT algorithm absent expansion of SRAM capacity, i.e., when the SRAM capacity is fixed, by using both an SRAM and a high-capacity DRAM, as only an example.

One or more embodiments include an apparatus and method for extracting feature information that may enable image processing by accessing respective divided lesser resolution images, e.g., corresponding to respective allowable SRAM capacities of one or more hardware processing elements, iteratively from an entire higher resolution image stored in DRAM, as only an example.

Accordingly, in one or more embodiments, one or more SIFT cores may be physically configured to process a high-definition image effectively and a high-added value image may be processed in real time.

In addition, in one or more embodiment and only as an example, an apparatus and method for extracting feature information may process an image irrespective or independent of resolution of the image using an image processing algorithm requiring a high-capacity memory as well as an SIFT algorithm. Herein, the processing of the image irrespective or independent of the resolution of the image means that the resolution of the image does not control whether the image can be processed for feature information, as the image may be processed for feature information even when the resolution of the image is greater than a buffer capacity corresponding to a particular hardware processing element.

One or more embodiments are based on implementing the reading of image information of a portion of a source image, e.g., stored in a high-capacity memory, generating of one or more tile images based such respectively read portions of the source image, implementing the SIFT algorithm for each respective tile image, including any writing of second source image data, for example, back to the high-capacity memory and any subsequent similarly generated tile images of the second source image, and any outputting of any feature location(s) and corresponding descriptor(s). In one or more embodiments, the hardware demonstrated in FIGS. 1 and 4 are ARM processor systems, and include one or more cores that each respectively implement the SIFT algorithm for different tile images of a source image, sequentially or in parallel, for example. However, in one or more embodiments, embodiments may be implemented through alternative processors or processing elements, which may include one or distinct cores to similarly implement the SIFT algorithm, such as, a Digital Signal Processor (DSP) or a Reconfigurable Processor (RP). In addition, in an embodiment, such alternative processors or processing elements may select a filtering structure for storing various lines for SIFT processing of a high-capacity image, e.g., stored in a large hardware resource such as DRAM, using a small hardware resource, such as SRAM.

In addition, in one or more embodiments the apparatus configured to extract feature information, such as demonstrated in FIGS. 1 and/or 4 as only an example, may be a product with features exceeding a simple feature of taking pictures, e.g., a camera product that also creates a panoramic view and/or acquires location information. As only an example, the camera may be a handheld mobile image captured device or a robot, such as robot vacuum cleaner. Further, as only an example, the apparatus configured to extract feature information may be a digital camera, a TV, a phone camera, a camera for games (for example, a pose/motion estimating or determining device), and a camera for restoring a three-dimensional model. Here, these examples should not be considered as limiting of products that perform SIFT processing, rely upon feature location and/or or corresponding descriptor information based on the SIFT processing, perform matching of features between two or more images, or matching of feature information derived from the SIFT processing with a model or a known particular collection of feature information, such as with detection of an object in the source image, recognizing of a face, or recognizing of a motion or motion tracking, as only examples. In one or more embodiments, feature information that is derived from the SIFT processing may be scale-invariant feature information.

In addition to the above described embodiments, embodiments can also be implemented by at least one processing device, such as a processor or computer. Further to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device. The processing element may be a specially designed computing device to implement one or more of the embodiments described herein.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for extracting feature information, the apparatus comprising:
a first interface generating plural tile images from a first source image by reading respective divided portions from the first source image stored in a high-capacity short-term memory; and
a feature information extractor extracting feature information from at least one of the plural tile images by applying a feature transform to the at least one tile image,
wherein the first interface generates the at least one tile image by dividing the first source image, into at least one of the respective portions of the first source image, based on a horizontal resolution of the first source image, and
wherein the first interface completes a writing of the generated at least one tile image to a buffer memory having less capacity than the high-capacity short-term memory, even when a horizontal resolution of the first source image results in a quantity of data that is greater than a horizontal capacity of the buffer memory.

2. The apparatus of claim 1, wherein the respective divided portions overlap.

3. The apparatus of claim 1, wherein the respective divided portions are disposed to partially overlap with a predetermined area.

4. The apparatus of claim 3, wherein the buffer memory is a SRAM memory and the high-capacity short-term memory is a DRAM memory.

5. The apparatus of claim 1, wherein a configuration of the first interface and the feature information extractor conforms with an ARM architecture.

6. The apparatus of claim 1, wherein the feature transform is a scale-invariant feature transform (SIFT) algorithm.

7. The apparatus of claim 1, wherein the first interface generates a first tile image and a second tile image by dividing the first source image, corresponding to the respective portions of the first source image, based on a horizontal resolution of the first source image, such that an overlapping region of each of the first tile image and the second tile image has a predetermined area.

8. The apparatus of claim 7, wherein the first interface performs a reading of one of the respective portions of the source image from the high-capacity short-term memory, wherein the reading of the one portion of the source image is performed by writing the one portion of the source image into a buffer memory, as the first tile image, distinct from the high-capacity short-term memory, and wherein the buffer memory has a horizontal capacity that is less than a horizontal capacity of the high-capacity short-term memory.

9. The apparatus of claim 8, wherein the feature information extractor extracts, as the feature information, a feature location of the first tile image and a descriptor corresponding to the feature location of the first tile image.

10. The apparatus of claim 1, wherein the feature information extractor extracts, as the feature information, at least one of a feature location of the at least one tile image and a descriptor corresponding to the feature location.

11. The apparatus of claim 1, wherein the feature information extractor determines the at least one tile image to respectively be at least one first octave, generates at least one Gaussian image by convolving the at least one first octave with a Gaussian filter, generates at least one difference of Gaussians (DoG) image from the at least one Gaussian image generated, generates a candidate feature from the at least one DoG image generated, and extracts the feature information from the candidate feature.

12. The apparatus of claim 11, wherein the feature information determines the at least one first octave, generates the at least one Gaussian image, generates the at least one DoG image, generates the candidate feature from the at least one generated DoG image, and extracts the feature information, according to a scale-invariant feature transform (SIFT) algorithm.

13. The apparatus of claim 1, wherein the feature information extractor determines the at least one tile image to be at least one first octave and determines a first candidate feature from the determined at least one first octave,
the feature information extractor generates at least one second octave by downsizing the at least one first octave and determines a second candidate feature based on the generated at least one second octave, and
the feature information extractor extracts the feature information by comparing the determined first candidate feature to the determined second candidate feature.

14. The apparatus of claim 13, further comprising:
a second interface generating at least one reduced image by the downsizing of the at least one first octave, generating a second source image by removing an overlapped region of the generated at least one reduced image, and executing write processing of the generated second source image to store the generated second source image in the high-capacity short-term memory.

15. The apparatus of claim 14, wherein the first interface generates at least one tile image of the second source image by reading a respective portion of the second source image, of plural portions of the second source image, from the high-capacity short-term memory, and
the feature information extractor determines the at least one tile image of the second source image as a second octave and determines a second candidate feature of the second octave.

16. A method of extracting feature information of a source image, the method comprising:
generating plural tile images from a first source image by reading respective divided portions from the first source image stored in a high-capacity short-term memory;
writing at least one of the plural tile images to a line buffer having less capacity than the high-capacity short-term memory, even when a horizontal resolution of the first source image results in a quantity of data that is greater than a capacity of the line buffer; and
extracting feature information from at least one of the plural tile images by applying a feature transform to the at least one tile image,
wherein the generating of the plural tile images from the first source image includes generating a first tile image and a second tile image by dividing the first source image into at least two corresponding portions, as the respective portions of the first source image, based on a horizontal resolution of the first source image such that there exists an overlapped region of the first tile image and the second tile image having a predetermined size.

17. The method of claim 16, wherein the writing at least one of the plural tile images to the line buffer is performed based on a buffer memory being an SRAM memory and the reading of the respective portions of the first source image is performed based on the high-capacity short-term memory being a DRAM memory.

18. The method of claim 16, wherein the feature transform is a scale-invariant feature transform (SIFT) algorithm.

19. The method of claim 16, wherein the extracting of the feature information comprises:
determining the at least one tile image to be at least one first octave and determining at least one first candidate feature from the determined at least one first octave;
generating at least one second octave by downsizing the at least one first octave and determining a second candidate feature based on the determined at least one second octave; and
extracting the feature information by comparing the determined first candidate feature to the determined second candidate feature.

20. The method of claim 19, further comprising:
generating at least one reduced image by the downsizing of the at least one first octave, to generate a second source image by removing an overlapped region of the generated at least one reduced image, and to execute write processing of the generated second source image to the high-capacity short-term memory.

21. The method of claim 20, further comprising:
generating at least one tile image from the second source image by reading respective portions of the second source image stored in the high-capacity short-term memory,
wherein the determining of the second candidate feature comprises determining the at least one tile image of the second source image to be a second octave and determining the second candidate feature of the second octave.

22. A non-transitory computer-readable recording medium comprising computer readable code to control at least one processing device to implement the method of claim 16.

* * * * *